March 4, 1958
B. P. FIEBER
2,825,370
STUMP REMOVER AND ROUTER
Filed July 5, 1956
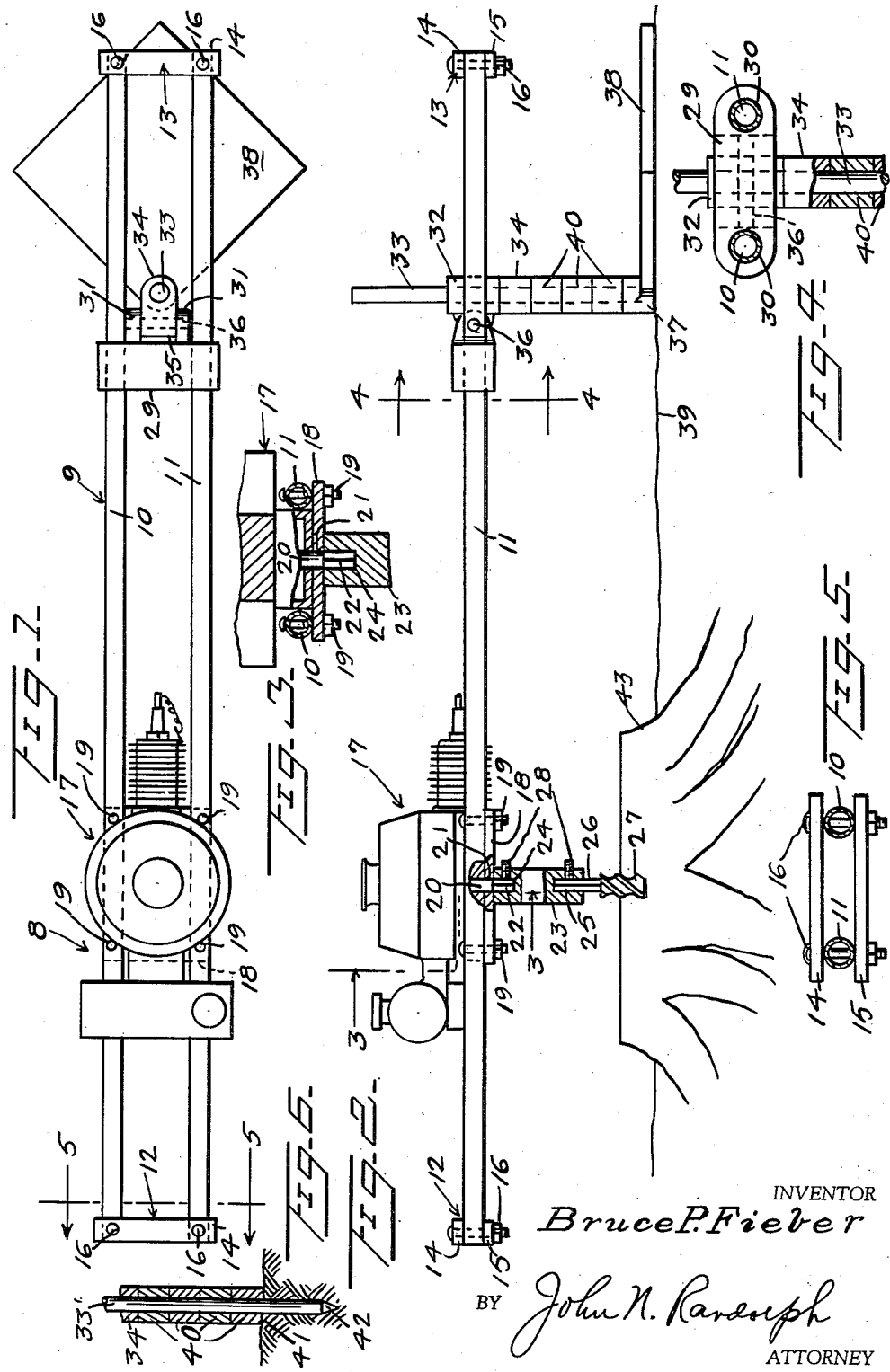
INVENTOR
*Bruce P. Fieber*
BY *John N. Randolph*
ATTORNEY

United States Patent Office 2,825,370
Patented Mar. 4, 1958

2,825,370

STUMP REMOVER AND ROUTER

Bruce P. Fieber, Milwaukee, Wis.

Application July 5, 1956, Serial No. 595,901

2 Claims. (Cl. 144—2)

This invention relates to a novel apparatus for use primarily as a stump remover and which may be expeditiously employed for removing a stump by a routing operation.

More particularly, it is an aim of the present invention to provide a device for supporting a prime mover to which a routing bit is connected and which device may be readily supported and moved manually in any desired direction to effectively rout out a stump.

Still another object of the invention is to provide a device of unique construction by means of which a part of the weight of the device including the prime mover supported thereby will be sustained by a part of the device, with the remainder of the weight of the device supported manually by the operator so that the portion of the load supported by the operator may be utilized to effect penetration of the cutting bit.

A further object of the invention is to provide a stump remover or router which may be readily dismantled and which is capable of being readily moved manually while only partially dismantled so that the device can be readily reassembled in a new location.

Various other objects and advantages of the invention will hereinafter become more fully apparent from the following description of the drawing, illustrating presently preferred embodiments thereof, and wherein:

Figure 1 is a top plan view of the stump remover or router;

Figure 2 is a side elevational view partly in vertical section thereof;

Figure 3 is an enlarged fragmentary cross sectional view, taken substantially along a plane as indicated by the line 3—3 of Figure 2;

Figure 4 is an enlarged fragmentary cross sectional view, taken substantially along a plane as indicated by the line 4—4 of Figure 2;

Figure 5 is an enlarged cross sectional view, taken substantially along a plane as indicated by the line 5—5 of Figure 1, and Figure 6 is a fragmentary vertical sectional view illustrating a modification of a part of the device.

Referring more specifically to the drawing, the stump remover or router in its entirety and comprising the invention is designated generally 8 and includes an elongated relatively narrow frame, designated generally 9, composed of corresponding side members 10 and 11 and corresponding end members 12 and 13. The frame sides 10 and 11 each preferably comprises an elongated substantially rigid rod which is preferably hollow or tubular, as illustrated in Figures 3, 4 and 5. Each frame end 12 and 13, as best illustrated in Figure 5, includes a pair of rigid bars 14 and 15 between which corresponding ends of the frame sides 10 and 11 are disposed, and to which said bars 14 and 15 are detachably connected by bolt and nut fastenings 16 the bolts of which extend through the bars 14 and 15 and through the frame sides 10 and 11. The frame sides 10 and 11 are thus maintained in spaced apart parallel relation to one another by the frame ends 12 and 13.

A conventional prime mover 17, such as a small gasoline engine, has a base plate 18 the side edge portions of which engage against portions of the undersides of the frame side members 10 and 11 and are secured thereto by nut and bolt fastenings 19, the bolts of which extend through the frame sides 10 and 11 and through the base plate 18, for securing the prime mover immovably but detachably to the frame 9. The prime mover extends upwardly between the frame sides 10 and 11 and is preferably located nearer the frame end 12 than the frame end 13. The prime mover 17 includes a rotary drive shaft 20 which extends downwardly therefrom through an opening 21 of the base plate 18 and the shaft 20 has a lower portion 22 of noncircular cross section extending downwardly from the opening 21.

An adapter coupling 23 has aligned sockets 24 and 25 opening outwardly of the ends thereof. The upper socket 24 conformably fits over the shaft end 22 and the lower socket 25 is shaped to receive and conformably fit a stem or shank 26 of a router bit 27, which extends from the lower end of said stem 26. Setscrews 28 are threaded radially of the adapter 23 into the sockets 24 and 25 for clamping said adapter to the shaft end 22 and for clamping the stem thereto.

A crossbar 29 has aligned bores 30 adjacent the ends thereof through which the frame sides 10 and 11 slidably extend for mounting said crossbar on the frame 9 between the prime mover 17 and the frame end 13. The crossbar 29 has a pair of spaced ears 31 extending from one side thereof and which are disposed between and spaced from the frame sides 10 and 11.

A sleeve 32 is turnably and slidably mounted on the upper portion of a substantially upright stabilizing post 33. The sleeve 32 rests on and is turnable relative to a collar 34 which is mounted on the post 33 and by means of which the sleeve 32 is swively supported at a desired elevation on the post 33. The sleeve 32 has an ear 35 extending laterally therefrom and which fits loosely between the ears 31. A pivot pin 36 extends through the ears 31 and loosely through the ear 35 for pivotally connecting the sleeve 32 to the crossbar 29.

In the embodiment of the invention as illustrated in Figures 1 to 5, the lower end of the post 33 seats in an upwardly opening socket 37 which forms a part of a relatively large base 38 which is adapted to rest upon a surface 39. The collar 34 is shown supported by a plurality of spacing sleeves 40 which are mounted on the post 33 between said collar and the socket 37, and it will be readily apparent that the number of spacing sleeves 40 may be increased or decreased to vary the elevation of the sleeve 32 relative to the supporting surface 39. However, the collar 34 may be secured to the post 33 and the spacing sleeves 40 may be omitted. The base 38 and socket 37 are utilized with the post 33 when the surface 39 constitutes a hard substantially impenetrable surface. If the surface is earth as illustrated at 41 in Figure 6, the base 38 and socket 37 may be dispensed with and the lower end of the post 33′ may be sharpened as seen at 42 so that the post can be driven into the earth 41 to a desired depth to maintain the post in an upright position. The spacing sleeves 40 may then be utilized to support the collar 34 at a desired elevation on the post 33′ with the lower sleeve 40 resting on the ground 41, or the collar 34 can be secured immovably to the post 33′ and the spacing sleeves 40 can be omitted.

Either the post 33 or 33′ is positioned adjacent a stump 43 to be removed and with the sleeve 32 swively supported on the post by the collar 34. The frame end 12 is utilized as a handle and is grasped by the operator for lifting the portion of the frame 9 which supports the prime mover 17, said frame swinging vertically about the pivot 36. The frame 9 can be moved longitudinally thereof relative to the post by exerting a pulling or pushing force on the frame end or handle 12 for moving the prime mover 17 and the router bit 27 either toward or away from the post 33 or 33', to position the router bit 27 in a desired location over the stump 43. The frame may also be swung horizontally by the sleeve 32 turning on the post. Thus, the frame 9 and the prime mover and router blade supported thereby has substantial universal movement relative to the post. The frame end 12 is swung downwardly to cause the router bit 27 to execute a gouging cut in the stump 43 and the weight of the parts located to the left of the pivot pin 36, as seen in Figures 1 and 2, will exert a substantial downward force on the router bit to expedite the cutting operation thereof. After the router bit 27 has penetrated the stump 43 it can be moved in all directions relative to the stump by a horizontal swinging of the frame 9 with the sleeve 32 around the post 33 or 33' and by a sliding movement of the frame through the cross-bar 29, so that the stump 43 can be completely routed out.

Various modifications and changes are contemplated and may be resorted to without departing from the function or scope of the invention as hereinafter defined by the appended claims.

I claim as my invention:

1. An apparatus of the character described comprising an elongated relative narrow frame, a prime mover secured to said frame adjacent to one end thereof and supported thereby, said prime mover including a drive shaft, a cutting element secured to the drive shaft and supported thereby beneath the frame and prime mover, and upright post, and means forming a connection between said post and the frame, said last mentioned means being slidably connected to the frame between the prime mover and the other end of the frame and being swivelly connected together to the post and including sections pivotally connected about an axis disposed crosswise of and spaced from the post for reciprocating movement of the frame and prime mover relative to the post in a direction longitudinally of the frame and for swinging movement of the frame and prime mover in vertical and horizontal planes relative to the post, said frame including spaced substantially parallel sides, said means connecting the frame and post including a crossbar having sleeve portions slidably engaging said frame sides and a sleeve swivelly mounted on the post, said crossbar and sleeve constituting the pivotally connected sections of said connecting means, said frame sides straddling the post and the pivotal connection of the sections of the connecting means.

2. An apparatus of the character described comprising an elongated relatively narrow frame including spaced substantially parallel sides, a prime mover disposed in and extending through said frame and secured to and supported by said frame sides adjacent one end of the frame, a cutting element, said prime mover having a drive shaft extending downwardly therefrom, means coupling said cutting element to the drive shaft below the frame, an upright post, a sleeve slidably and turnably mounted on said post, means supporting said sleeve at a desired elevation relative to the post, a lug projecting laterally from said sleeve, a crossbar having parallel sleeve portions through which said frame sides slidably extend, a pair of lugs projecting laterally from one side of said crossbar between said sleeve portions, said lugs of the pair of lugs straddling said sleeve lug, and a pivot element extending through said lugs for pivotally connecting the crossbar to the sleeve about an axis disposed crosswise of the sleeve and post for vertical and horizontal swinging movement of said frame relative to the post, and said frame having a handle at said aforementioned end thereof between which handle and the post the prime mover is disposed and which handle is adapted to be manually engaged for supporting and manipulating said frame end and the prime mover and cutting element.

References Cited in the file of this patent

UNITED STATES PATENTS

| | | |
|---|---|---|
| 1,164,659 | Moore | Dec. 21, 1915 |
| 1,855,368 | Spear et al. | Apr. 26, 1932 |
| 2,671,478 | Anderson et al. | Mar. 9, 1954 |
| 2,708,463 | Coleman | May 17, 1955 |
| 2,718,907 | Fjalstad | Sept. 27, 1955 |